US007228771B2

(12) United States Patent
Muscarella et al.

(10) Patent No.: US 7,228,771 B2
(45) Date of Patent: Jun. 12, 2007

(54) AUTOMATIC SCREW MACHINE WITH MULTI-AXIS DRIVE CONTROL

(75) Inventors: Patrick L. Muscarella, Penfield, NY (US); Ronald LaRock, Sodus Point, NY (US); Charles D. Jackson, Rochester, NY (US)

(73) Assignee: Ram Technology LLC, Rochester, NY (US)

( * ) Notice: Subject to any disclaimer, the term of this patent is extended or adjusted under 35 U.S.C. 154(b) by 142 days.

(21) Appl. No.: 11/208,047

(22) Filed: Aug. 19, 2005

(65) Prior Publication Data
US 2006/0037442 A1 Feb. 23, 2006

Related U.S. Application Data

(60) Provisional application No. 60/602,805, filed on Aug. 19, 2004.

(51) Int. Cl.
*B23B 13/04* (2006.01)

(52) U.S. Cl. .............................. 82/1.1; 82/118; 82/162; 82/129; 29/38 A; 29/38 B

(58) Field of Classification Search .................. 82/1.1, 82/118, 129, 138, 153, 156, 162; 29/38 B, 29/38 A, 38 C
See application file for complete search history.

(56) References Cited

U.S. PATENT DOCUMENTS

| 4,255,991 | A | * | 3/1981 | Lambert ...................... 82/1.11 |
| 4,418,925 | A | | 12/1983 | Nowak |
| 4,509,765 | A | | 4/1985 | Nowak |
| 4,778,036 | A | | 10/1988 | Nowak |
| 4,834,220 | A | | 5/1989 | Nowak |
| 4,932,627 | A | | 6/1990 | Nowak |
| 4,988,072 | A | | 1/1991 | Nowak |
| 4,992,711 | A | * | 2/1991 | Sugita et al. ................ 318/561 |
| 4,995,625 | A | | 2/1991 | Nowak |
| 5,205,376 | A | | 4/1993 | Nowak |
| 5,269,543 | A | | 12/1993 | Nowak et al. |
| 5,356,244 | A | | 10/1994 | Nowak |
| 5,514,265 | A | | 5/1996 | Nowak et al. |
| 5,526,725 | A | * | 6/1996 | Tremaglio et al. ........... 82/1.11 |
| 5,762,345 | A | | 6/1998 | Nowak et al. |
| 5,797,802 | A | | 8/1998 | Nowak et al. |

(Continued)

OTHER PUBLICATIONS

The Davenport 5 Spindle Automatic Screw Machine Model B, Instruction Book, Davenport Machine, P.O. Box 228, Rochester, NY 14601 (1983 Edition); Revised Version Printed May 30, 1987.
Alpha Grainger Manufacturing, Inc.; Production Capabilities page; c. 2003; 2 page Web-based article.

(Continued)

*Primary Examiner*—Willmon Fridie, Jr.
(74) *Attorney, Agent, or Firm*—Duane C. Basch; Basch & Nickerson LLP

(57) ABSTRACT

The disclosed embodiments are directed to an improved automatic screw machine employing a first servomotor connected to cause rotation of a first set of tooling cams independently of the operation of a spindle drive, and a second servomotor to cause rotation of a second set of cams independently of the operation of the spindle drive, wherein a multi-axis controller controls at least the speed of the spindle drive in conjunction with at least each of the two servomotors, and where the operation of at least the two servomotors is electronically synchronized.

19 Claims, 16 Drawing Sheets

U.S. PATENT DOCUMENTS

| | | | |
|---|---|---|---|
| 5,910,201 | A | 6/1999 | Muscarella et al. |
| 5,953,970 | A * | 9/1999 | Haller et al. .................. 82/129 |
| 6,000,499 | A | 12/1999 | Nowak et al. |
| 6,205,372 | B1 * | 3/2001 | Pugh et al. ................. 700/193 |
| 6,219,895 | B1 | 4/2001 | Muscarella et al. |
| 6,263,553 | B1 | 7/2001 | Muscarella et al. |
| 6,421,895 | B2 * | 7/2002 | Muscarella et al. ......... 29/38 B |
| 2003/0154831 | A1 | 8/2003 | Nowak et al. |

OTHER PUBLICATIONS

Davenport Machine, Inc.; Technical Information; c. 2003; Davenport Machine, Inc., 167 Ames Street, Rochester, NY 14611, Teclephone 1-800-344-5748; Davenport 5 spindle automatic screw machine general information, capabilities, technical description.

Nowak Products, Inc., 101 Rockwell Road, Newington CT 06111, Telephone 1-800-423-0970; Sales page for replacement componentns for Davenport products.

Nowak Products, Inc., 101 Rockwell Road, Newington CT 06111, Telephone 1-800-423-0970; Sales page for Nowak Servo Drive for Davenport Model B.

Redux International Corporation and Dav-Ro Machine Tool Limited new announcement of U.S./Canadian cooperation agreement and New development "Dav-Ro Multi 5" with description of componenents and benefits of "Dav-Ro Multi 5".

Kissell, Thomas E.; Compound Motors; National Instruments; Compound Motors-Tutorial-Development Library-National Instruments; c. 2004 National Instruments Corporation; http://zone.ni.com/devzone/conceptd.nsf/webmain/281704933689AAD862568400051C24E; Sep. 16, 2004.

Altivar 58 TRX Adjuctable Speed Drive Controllers; Installation Guide Type H Controllers; VVDED397048USR8/02; Aug. 2002; Raleigh, NC; c. 1998-2002 Schneider Electric.

* cited by examiner

AUTOMATIC SCREW MACHINE WITH MULTI-AXIS DRIVE CONTROL

This application claims priority from U.S. Provisional Application for Patent No. 60/602,805, filed Aug. 19, 2004 by P. Muscarella, which is hereby incorporated by reference in its entirety.

The following disclosure relates generally to an improved automatic screw machine such as a Davenport Model B screw machine or the like, and more particularly to a screw machine employing a first servomotor connected to cause rotation of side cams independently of the operation of a spindle drive and a second servomotor to cause rotation of the end cams independently of the operation of the spindle drive.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

The Davenport multi-spindle automatic screw machine, originally built in the early 1900's, is a screw machine that has had few major design changes made to it since its' early construction. As a result, parts made for new machines today are able to fit older machines, and it is one of the least expensive screw machines to maintain.

Heretofore, several patents and publications have disclosed aspects of and improvements to Davenport screw machines:

U.S. Pat. No. 5,910,201 to Muscarella et al., issued Jun. 8, 1999 for a "MULTIPLE SPINDLE SCREW MACHINE," incorporated herein by reference in its entirety, U.S. Pat. No. 6,219,895 to Muscarella et al., issued Apr. 24, 2001 for a "MACHINE TOOL WITH SERVO DRIVE MECHANISM" and its related continuing application patents (U.S. Pat. No. 6,263,553 and U.S. Pat. No. 6,421,895), each of the above patents being individually incorporated herein in their entirety by reference; and "The Davenport 5 Spindle Automatic Screw Machine Model B, Instruction Book," Davenport Machine, P.O. Box 228, Rochester, N.Y. 14601 (1983 Edition); Revised Version Printed May 30, 1987, which is also incorporated herein by reference in its entirety.

In general, the Davenport screw machine, such as the Model B (Prior Art FIG. 1), is designed to manufacture parts at rates from 120-4500 pieces per hour. Most parts are made complete with no secondary operations, thereby reducing the overall cost of the part. The Davenport screw machine 110 is designed for high volume low cost production, and is particularly well suited to produce threaded parts, both internal and external, as well as slots, flats, holes, recesses, trepans and knurling for example. The Davenport screw machine operates on bar stock inserted into collets associated with one of a plurality (five) of workstations on one end of the machine. Then the workstations index around to various tools that cut the stock down to the finished part—performing a different machining operation at each tool. Once complete, the part is separated from the stock and ejected away from the tooling area, where it is collected with other parts. Although the tooling and set up for a particular part may be somewhat time consuming, the machine will then be capable of reproducing many such parts.

Referring to FIG. 1, there is shown a screw machine 100 having a motor 102 is connected via pulleys 104 to a gear assembly 106, which in turn drives a bevel gear set 108. The gear assembly 106, including bevel gear set 108 directs operating power from the motor 102 to a drive shaft 110 and to another coupled drive shaft 112 extending perpendicularly to the drive shaft 110. The drive shaft 110 extends to a rear worm 116, which drives a gear 172. The gear 172 causes rotation of an end cam shaft 174, which in turn rotates a plurality of tool spindle cams 176. The tool spindle cams 176, in turn, effect the operation of end tools (175) that are mounted on the stationary head 177. The drive shaft 168 drives a front worm 180, which drives a gear 182. The gear 182 in turn drives a side cam shaft 184 to cause rotation of a plurality of cross slide and tool cams 186 and a locating cam 188. The drive shaft 184 also causes rotation of a chuck and feed cam 190. The drive shaft 168 and gear assembly 106 are used, in general to control the rotation and indexing of the revolving head 120, collets 122, Geneva disc 124, and the various tool arms 126 in accordance with the well-known operation of the Model B machine. Also driven from motor 102 is a lubricator 190 and, indirectly, an oil pump 192.

As described in prior patents (e.g., U.S. Pat. No. 6,219,895) one problem with conventional screw machines is a lack of control over the indexing drive mechanism, which may be independent from the spindle drive mechanism. The cam shaft and indexing drive mechanism, as illustrated in FIG. 2, is driven by a single servomotor, and a variable frequency drive motor operates the spindles of the machine tool. Furthermore, a computer control system controls and monitors the operation of the machine tool. As depicted in prior art FIG. 2, the servomotor 146 is operatively connected to a gear box 156, which in turn drives a bevel gear set 158 through a coupling 160. The bevel gear set 158 directs operating power from the servomotor 146 to a drive shaft 166 and to another coupled drive shaft 168 extending perpendicularly to the drive shaft 166. The drive shaft 166 extends to a rear worm 170, which drives a gear 172. The gear 172 causes rotation of an end cam shaft 174, which in turn rotates a plurality of tool spindle cams 176. The drive shaft 168 drives a front worm 180, which drives a gear 182. The gear 182 in turn drives a side cam shaft 184 to cause rotation of a plurality of cross slide cams 186 and a locating cam 188. The drive shaft 184 also causes rotation of a chuck and feed cam 190 and an absolute encoder 192.

The disclosed embodiments are directed to an electromechanical spindle and camshaft drive system to replace and improve existing mechanical systems common to multi-spindle machine tools such as the Davenport Model B as generally depicted in FIG. 1. Generally, a common power source is used in the Model B to drive main spindles and/or camshafts though a series of shafts, gears, clutches, and gear reductions. One embodiment disclosed herein uses a programmable logic or similar controller to control operation the main spindles, both camshafts and threading axes, all independently of one another. The independent axes are driven by associated servomotors and controlled by a code-driven logic controller though ladder logic. The disclosed system will transform, and be suitable for use on, existing multi-spindle machine tools such as a Davenport Model B; making them more productive, more efficient and significantly reducing setup/run-in and maintenance requirements that are a burden in existing systems. The disclosed embodiments allow the elimination of integral systems inherent in "old" screw machine technology incorporating bushings, and worm or similar drives that are subject to mechanical wear of one type or another. The replacement system disclosed herein is more efficient, with lower associated replacement costs.

Productivity and efficiency of existing multi-spindle machine tools will improve because fewer mechanical parts (e.g., shafts, bushings, gears, clutches, and gear reductions) are used and the system is more reliable and repeatable than traditional mechanical systems because of the electronic controls and replacement of several busing assemblies with precision bearings. Furthermore, maintenance requirements are reduced due to the reduction in the number of service parts required. In addition, accessibility to various subassemblies and adjustment positions on the existing multi-spindle machine tools is greatly improved through modified mechanical design and independent drive motors, further reducing labor costs for maintenance.

In accordance with the one embodiment, there is provided a multiple spindle screw machine, comprising: a frame; a spindle supporting head operatively associated with the frame for indexible rotation; a plurality of work-supporting spindles mounted in said spindle supporting head for rotation therewithin and relative thereto about parallel axes radially spaced from and angularly spaced about a spindle drive shaft; a spindle drive, operatively connected to the spindle drive shaft, to effect rotation of the work supporting spindles, and lengths of stock carried thereby, about axes of rotation defined by the work supporting spindles; a side servomotor operatively connected to a side cam shaft to effect rotation of a plurality of side cams independently of the operation of the spindle drive, said side cam shaft extending parallel to the axes of rotation defined by the working spindles; side cams mounted on said side cam shaft, for rotation thereby and to cause operation of side machining tools thereby machining the lengths of stock; an end servomotor operatively connected to an end cam shaft and extending perpendicularly to the axes of rotation defined by the working spindles; at least one end cam mounted on the end cam shaft for rotation thereof independently of the operation of the spindle drive, and to cause operation of an end machining apparatus, thereby machining the lengths of stock carried by the work supporting spindles; and a multi-axis controller for controlling the operation of the spindle drive, the side servomotor and the end servomotor.

In accordance with another embodiment, there is provided a multiple spindle screw machine, comprising: a frame; a spindle drive shaft mounted on the frame for rotation about a stationary axis; a spindle supporting head mounted on the frame for indexible rotation coaxially about said spindle drive shaft; a plurality of work-supporting spindles mounted in said spindle supporting head for rotation therewithin and relative thereto by said spindle drive shaft about parallel axes spaced radially and angularly about said spindle drive shaft; a servomotor spindle drive operatively connected to the spindle drive shaft to effect rotation of the work supporting spindles and lengths of stock carried thereby; a side cam shaft extending parallel to the axes of rotation defined by the working spindles; a plurality of side machining tools positioned adjacent one another and along a line substantially parallel to the side cam shaft; a plurality of side cams, mounted on the side cam shaft, for rotation thereby to cause operation of said side machining tools thereby machining the lengths of stock; an indexing mechanism driven by the side cam shaft for sequentially indexing each of the working spindles through a plurality of workstations; an end cam shaft extending perpendicularly to the axes of rotation defined by the working spindles; at least one end machining apparatus positioned adjacent the end cam shaft; at least one end cam mounted on the end cam shaft for rotation thereby to cause operation of the end machining apparatus thereby machining the lengths of stock carried by the work supporting spindles; a side servomotor; means operatively connecting the side servomotor to the side cam shaft to effect rotation of the side cams independently of the operation of the spindle drive; an end servomotor; means operatively connecting the end servomotor to the end cam shaft to effect rotation of the end cams independently of the operation of the spindle drive; and a multi-axis controller for controlling the operation of the speed spindle drive means and the two servomotors.

In accordance with a further aspect of the disclosed embodiment, there is provided a method of operating a multiple spindle screw machine using a multi-axis controller, comprising: operating a spindle drive, operatively connected to a spindle drive shaft, to effect rotation of a plurality of work supporting spindles, and lengths of stock carried thereby, about axes of rotation defined by the work supporting spindles; in response to the controller, operating a side servomotor, operatively connected to a side cam shaft, to effect rotation of a plurality of side cams independently of the operation of the spindle drive, said side cams causing the operation of side machining tools to thereby machine the lengths of stock; operatively connected to an end cam shaft and extending perpendicularly to the axes of rotation defined by the working spindles, to cause the operation of an end machining apparatus independently of the operation of the spindle drive, and, thereby machining the lengths of stock carried by the work supporting spindles; and controlling the operation of the spindle drive, the side servomotor and the end servomotor.

One aspect of the disclosure deals with a basic problem in the afore-described prior art machines—that of the need for a large, expensive servomotor to drive the connected cam shafts (drive shafts 166 and 168 in FIG. 2) used to operate the tooling. Moreover, the prior art devices continue to utilize various mechanical parts (e.g., shafts, gears, clutches, and gear reductions) so as to operate the screw machine with a servomotor. Such parts are subject to various dimensional tolerances and wear, leading to the need to stock replacement mechanical parts. This aspect is further based on the discovery of a technique that alleviates this problem. The technique utilizes at least two independent, yet electronically synchronized, servomotors to replace the single servomotor of the prior art and various mechanical parts, particularly those that are known to be subject to wear. Such a substitution is not only less expensive, but enables the elimination or reduction of the wearable parts and will thereby assure accurate and reliable operation of the screw machine for longer periods of time, and consistent quality of parts produced thereon. Furthermore, by eliminating the unnecessary components, the disclosed embodiment "opens up" the screw machine so that necessary adjustments and maintenance may be more easily performed than is the case in the conventional and prior art systems. For example, set up of the machine is improved as the cross-slides no longer interfere.

The system and techniques described herein are advantageous because they are less expensive compared to other approaches, and make it unnecessary to utilize a single, large servomotor to operate components of the screw machine. The techniques are advantageous because they further acquire and operate on feedback from the independent servomotors employed to facilitate the control of the machine as well as the identification and isolation of any operational problems at an early stage. As a result of the improved design, it is possible to build or retrofit an automatic screw machine wherein a multi-axis controller controls at least the speed of the spindle drive in conjunction with the two servomotors operating the tooling cams, and where the independent operation of at least the two servomotors may be electronically synchronized. It will be appreciated that one disclosed embodiment, employs the aforementioned multi-axis controller to control the spindle drive and a threading drive or other tooling operation so as to further improve the synchronized operation of the screw machine and reduce the number of mechanical components (e.g., gears) required for operation of the machine.

Figure 1:
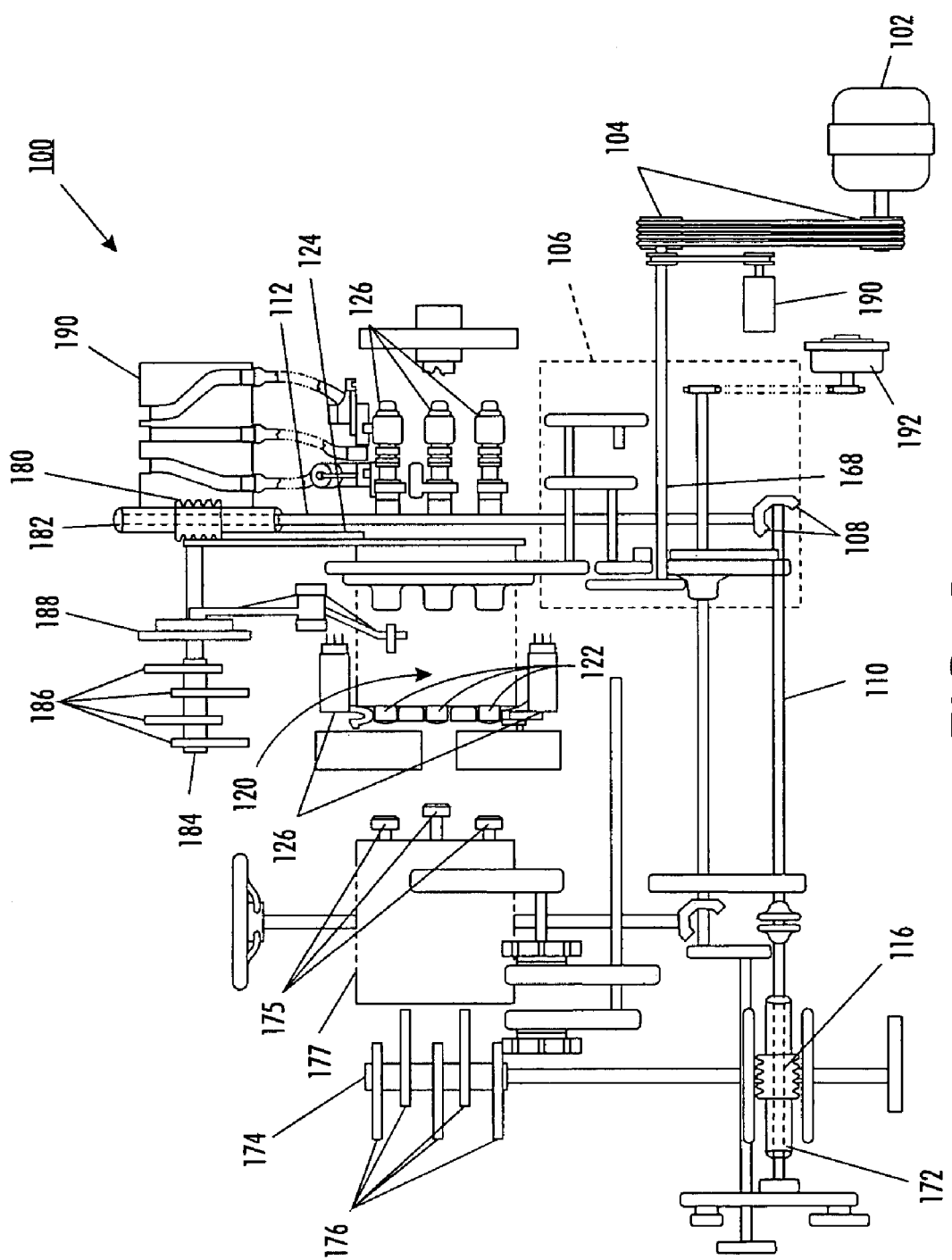
FIG. 1 is a schematic view of the tooling camshafts and cams of a prior art Davenport Model B screw machine.
Figure 2:
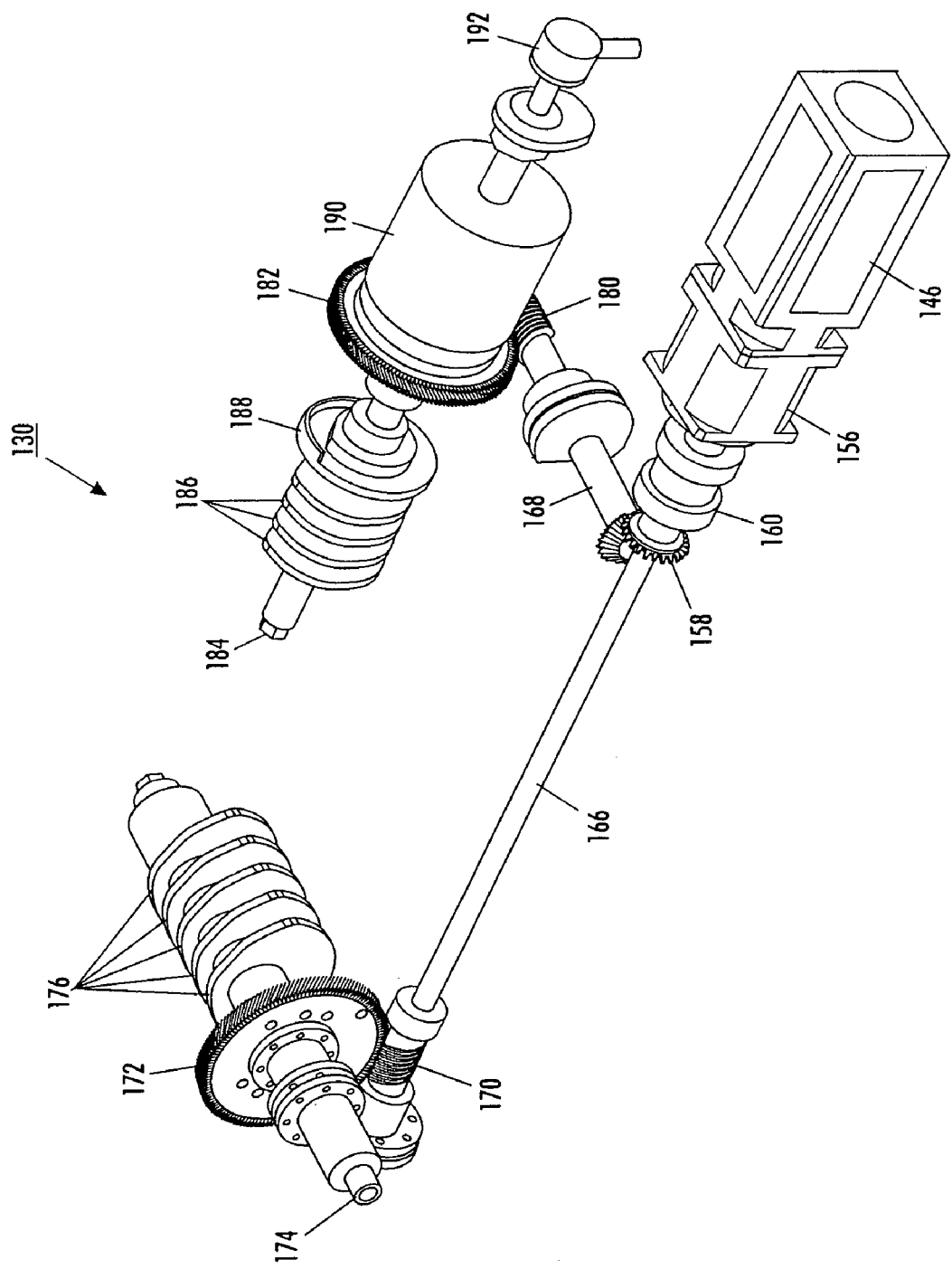
FIG. 2 is a perspective illustration of a prior art Model B improvement illustrating the gearing and servomotor drive mechanism therein.

The following disclosure will be presented in connection with a preferred embodiment, however, it will be understood that there is no intent to limit the embodiment described. On the contrary, the intent is to cover all alternatives, modifications, and equivalents as may be included within the spirit and broad scope defined by the appended claims.

DESCRIPTION OF THE PREFERRED EMBODIMENT

For a general understanding of the disclosure, reference is made to the drawings. In the drawings, like reference numerals have been used throughout to designate identical elements. In the various drawings described below, it is assumed that the reader has familiarity with a Davenport Model B screw machine, as certain parts and assemblies thereof are depicted in a cut-away form or are not shown to permit the illustration of particular embodiments.

Figure 3A:
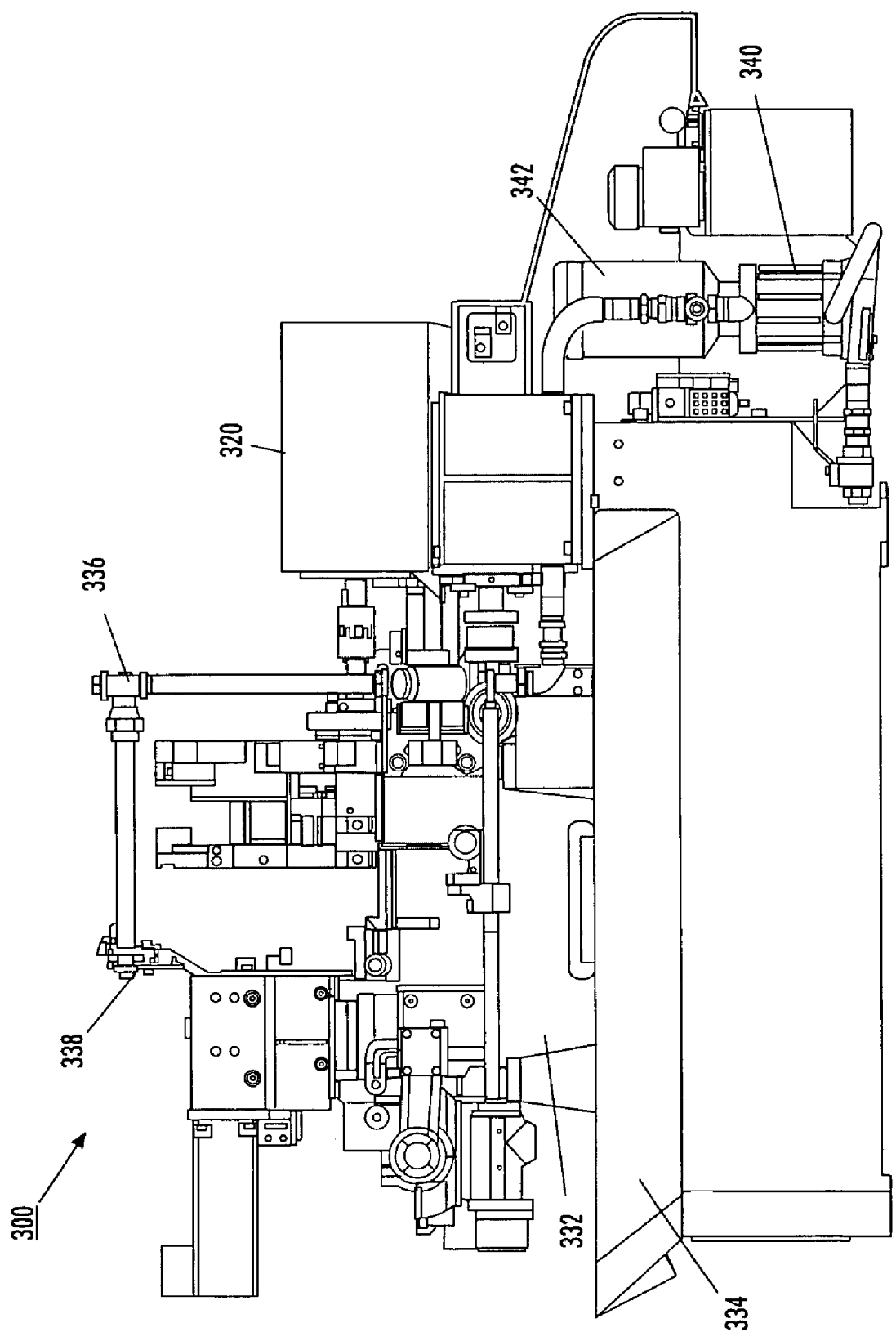
FIGS. 3A-3C are plan views of a screw machine including aspects of an embodiment incorporating several improvements.
Figure 3B:
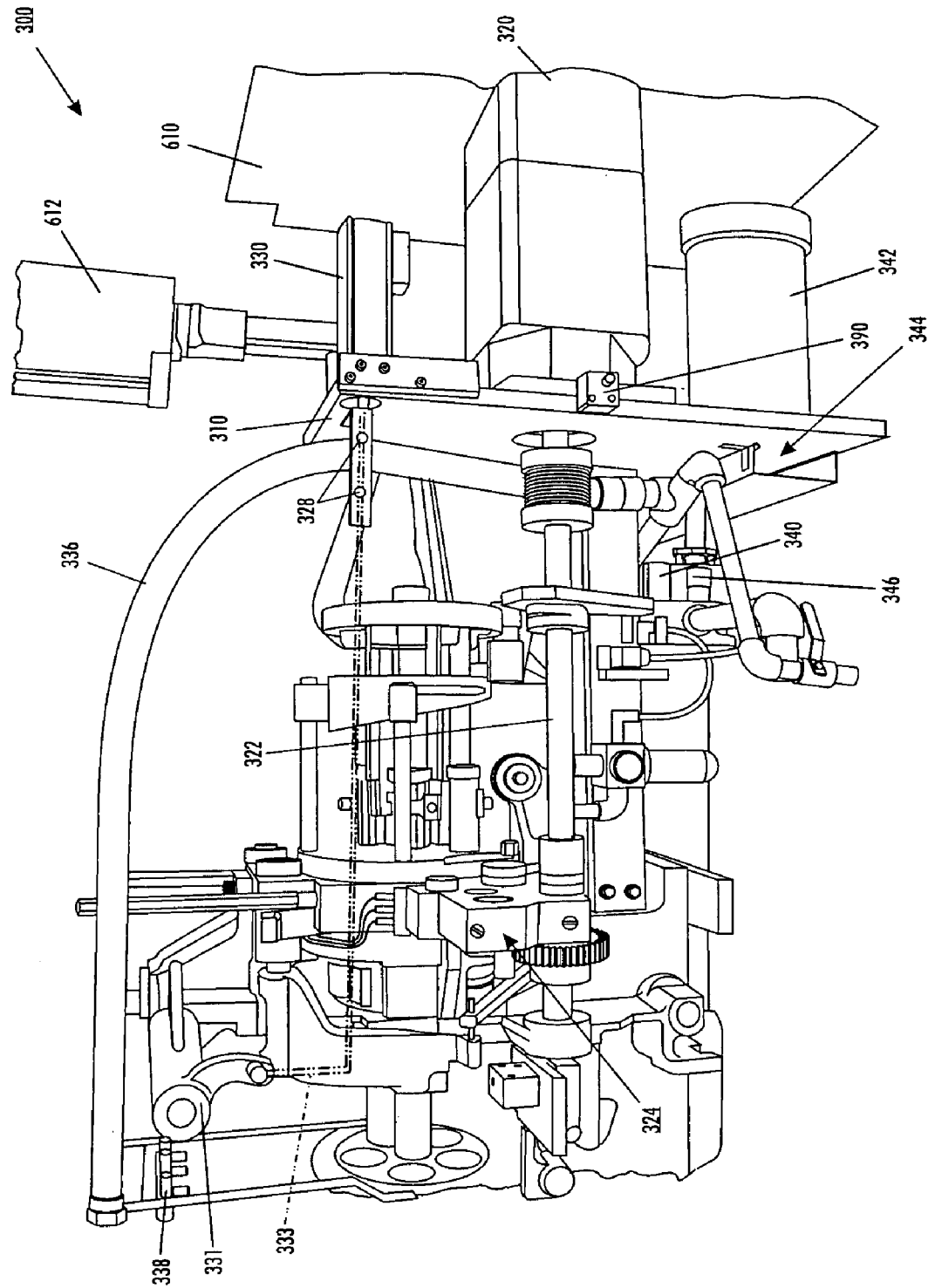
Figure 3C:
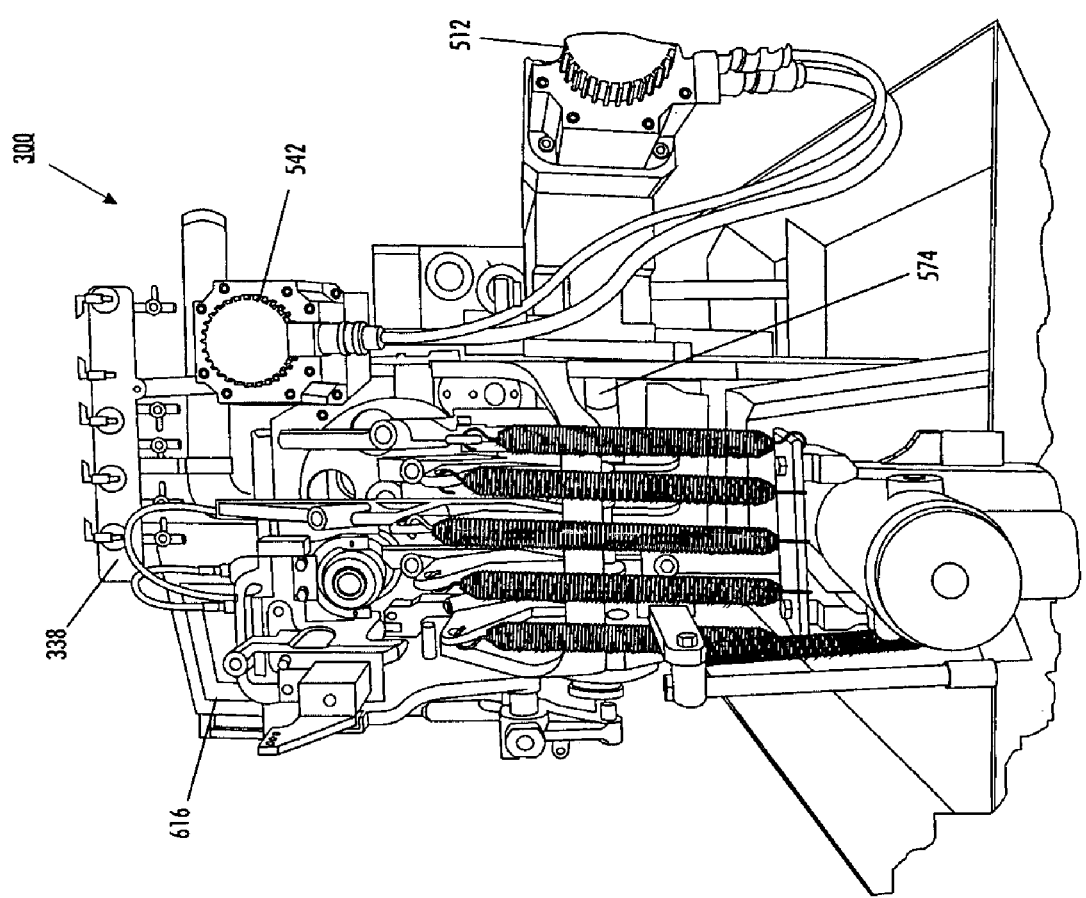

Referring first to FIGS. 3A, 3B and 3C the figures illustrate various aspects of the disclosed embodiments as perspective views of portions of a multiple spindle screw machine 300, and include various aspects that will now be described in more detail. The machine 300 comprises components of an apparatus commonly known as a screw machine (e.g., Davenport Model B) and includes a base or frame 332 resting on a suitable foundation or the like. The frame includes a pan 334, which serves as a coolant reservoir for the machine tool 300. A lubricating fluid pump assembly 340 is situated at one end of the screw machine 300. The lubricating fluid pump 340 directs lubricating fluid to all of the operating components of the machine tool 300 via a delivery pipe 336 and manifold 338. The coolant pump assembly functions to withdraw coolant from the pan 334 and to circulate coolant to all of the machining tools operated by the machine 300.

As illustrated in detail in FIG. 3B, the coolant recirculation system may include a motor-driven pump 340, which is driven from am electric drive motor 342 via a chain linkage and pulley assembly 344. In the embodiment of FIG. 3B, the pump includes a bypass line 346, whereby excess lubricating fluid is returned to pan 334, thereby eliminating the need to control the pump speed, yet providing adequate lubricating fluid capacity.

Further illustrated in FIG. 3B, is vertical plate 310, which is attached to pan 334, and provides a structure to which servomotor 320 may be mounted and its position adjusted relative to the spindle drive shaft 322. As will be described below, servomotor 320 operates in response to a controller (not shown) and its operation is in conjunction with other components of the machine tool 300. Servomotor 320, via drive shaft 322, causes the gear assembly 324 to rotate the spindle collets, thereby turning the bar stock (not shown) therein during setup and machining operations.

Also depicted in FIG. 3B is a linear drive 330, which is connected to the fourth position overhead workstation via a linkage 333. The fourth position workstation (e.g., part turning, cross-drilling, and part threading, use alternative tooling that is known for use on screw machines) is thereby controlled directly by a servo controller and is no longer operated in response to a rotating cam as in the conventional Model B machines. Elimination of the fourth position cam in the conventional screw machine also facilitates the use and positioning of the end cam servo drive 312. As a result of the use of the linear servo to drive the fourth position tooling, it is possible to facilitate setup and control of such tooling without operation of other machine components. The operation of linear drive 330 is sensed by limit sensors 328 to monitor the operational position of the fourth position tool. It will be appreciated that the use of the linear drive 330 eliminates several mechanical components found on the typical Model B, and reduces the tolerance build-up of the machine components.

Figure 3D:
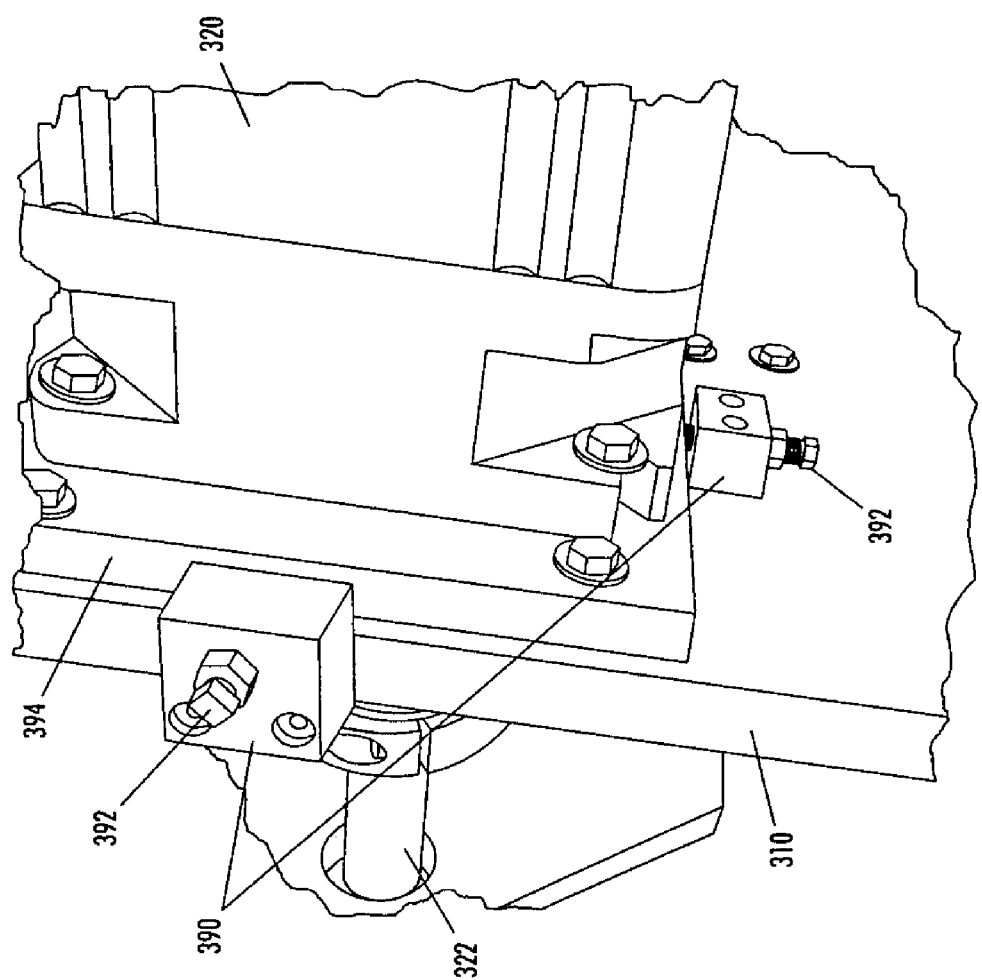
FIG. 3D is an enlarged view of an adjustment apparatus used to mount a servomotor in the embodiment of FIGS. 3A-3C.

Referring briefly to FIG. 3D, depicted therein is an enlarged view of the mounting of servomotor 320 to plate 310. As will be appreciated to achieve alignment of the servomotors with the shafts and existing assemblies of a Model B machine may require some adjustment. Accordingly, the adjustment mechanism 390 for aligning at least the servomotor, and possibly its associated transmission or speed reducer, with the respective cam or drive shaft (e.g., 322). The adjustment mechanism employed comprises a small block that is affixed to the plate 310, and includes a threaded hole through which an adjustment screw or bolt 392 is inserted, wherein the tip of the screw or bolt contacts mounting plate 394 of the motor or speed reducer. Mounting plate 394 has mounting holes that are larger in diameter than the mounting bolts used to hold it to plate 310, and thereby permits the adjustment of the position of the servomotor. It will be appreciated that although depicted with the spindle drive servo, similar mechanisms may be used for other servomotors as well.

Figure 4:
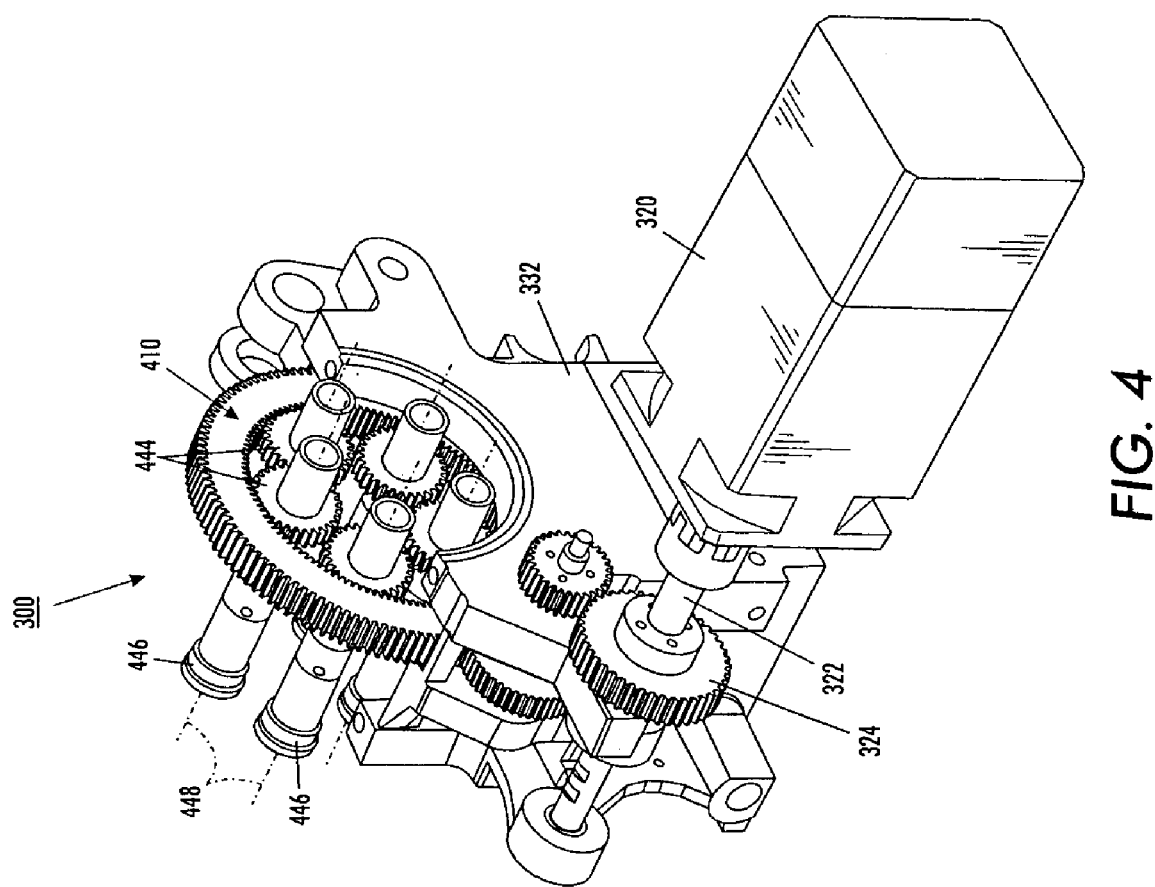
FIGS. 4 and 5A-C are detailed illustrations of various aspects and alternative embodiments disclosed in relation to the screw machine of FIG. 3.

Referring also to FIG. 4, screw machine 300 further includes, operatively associated with the frame 332, a spindle drive shaft 322, mounted for rotation about a stationary axis. A spindle drive supporting ring gear 410 is operatively connected to a revolving head having five revolving spindles therein for indexible rotation in response to the rotation of the drive shaft 322. It will be appreciated that drive shaft 322 may be coupled to the head via one or more gear assemblies or sets 324 so as to effectuate a speed control (e.g., reduction). A plurality of work-supporting spindles 446 are mounted in the spindle supporting head for rotation therewith and for rotation relative to the head by said spindle drive shaft about parallel axes 448, radially spaced from and angularly spaced about said spindle supporting head. A spindle drive servomotor 320 is operatively connected to the spindle drive shaft to effect rotation of the work supporting spindles 446 and the lengths of stock carried thereby about the axes of rotation defined by the work supporting spindles.

Figure 5A:
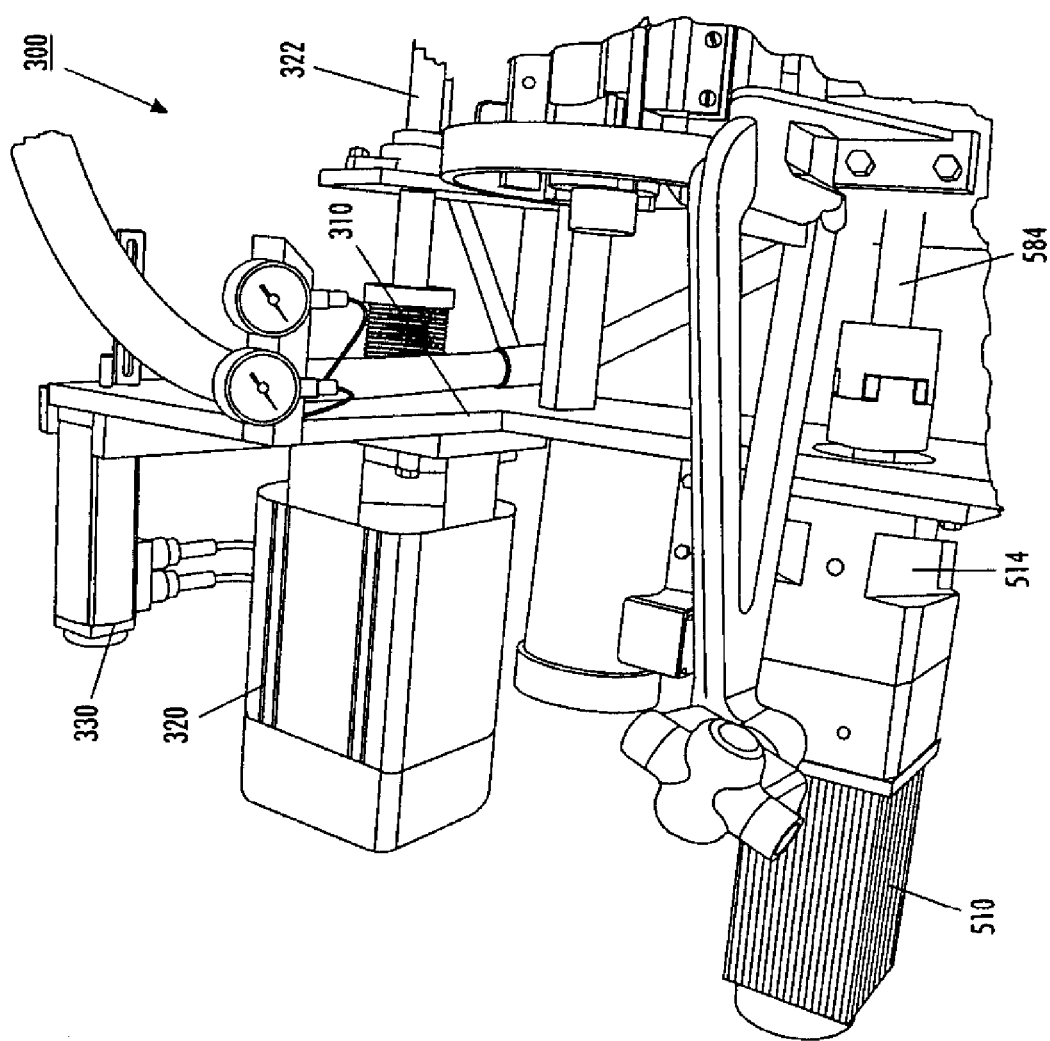
Figure 5B:
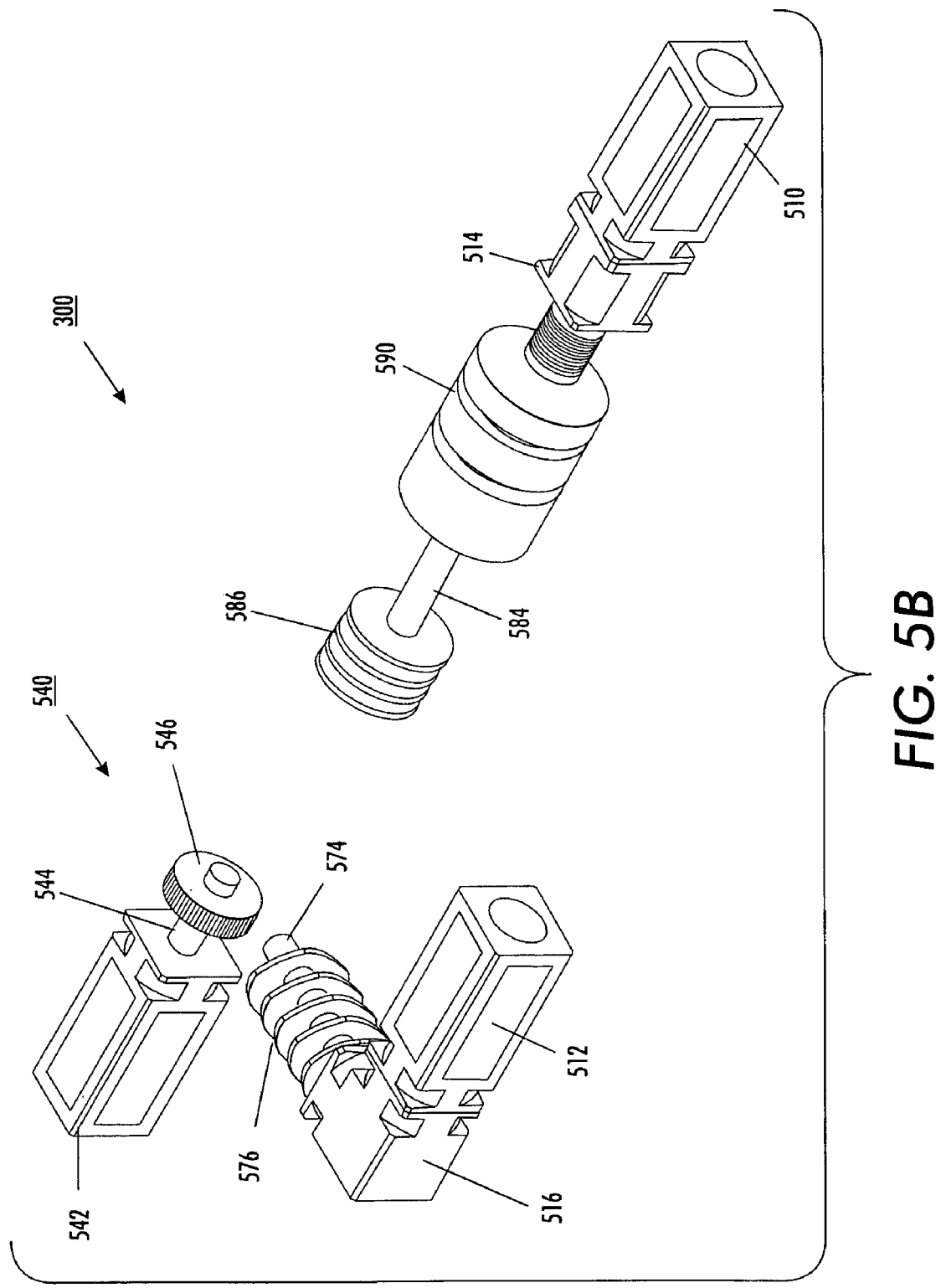
Figure 5C:
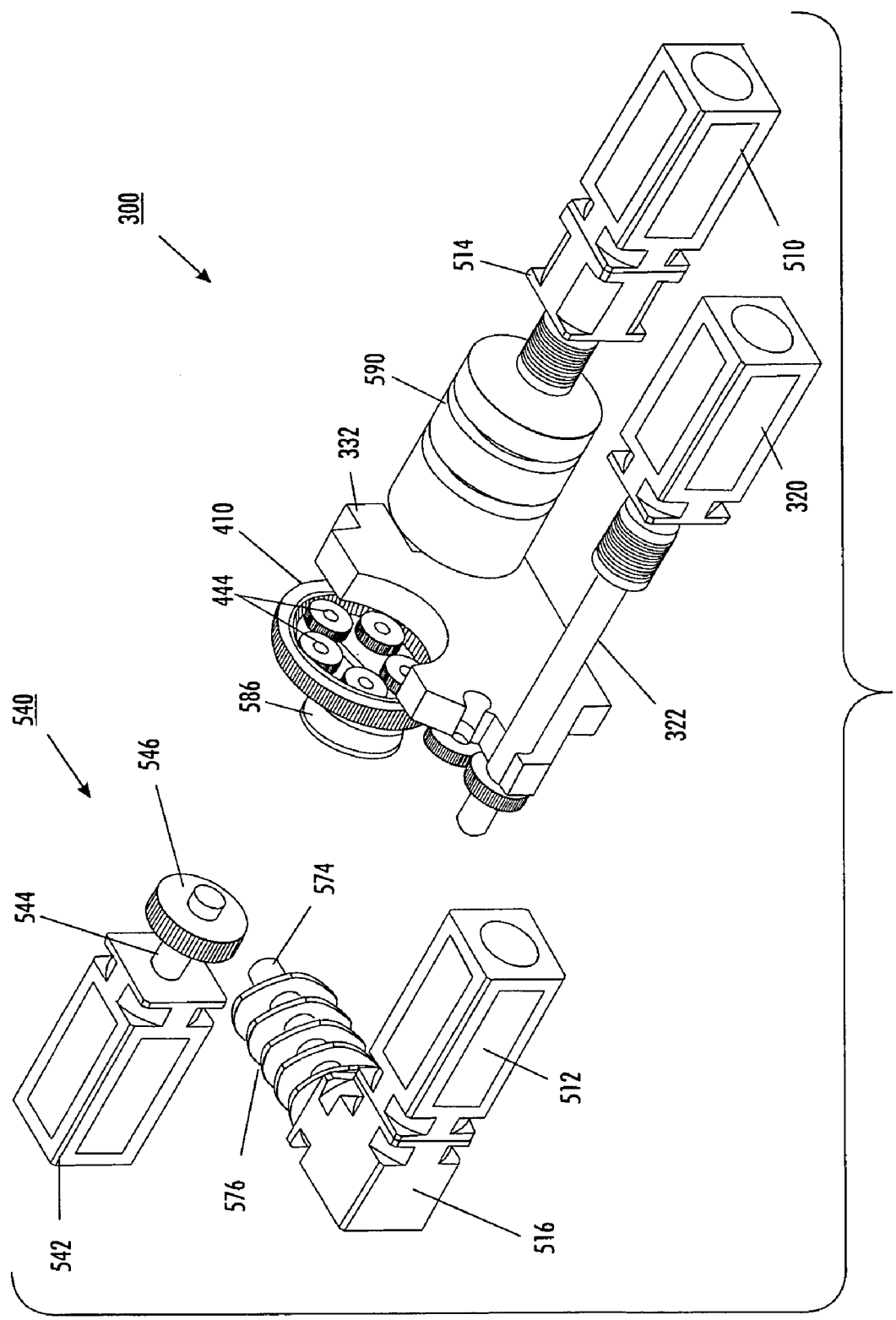

Referring also to FIGS. 5A through 5C, generally a side cam shaft 584 extends parallel to the axes of rotation 448 defined by the working spindles 446. A plurality of side machining tools (not shown), positioned adjacent one another and along a line substantially parallel to the side cam shaft, operate in response to a plurality of side cams 586 that are mounted on the side cam shaft 584, for rotation thereby to cause operation of said side machining tools 520, and to thereby contact and machine the ends of lengths of bar stock (not shown). Further, an indexing assembly 590, or similar mechanism, driven by or in conjunction with the side cam shaft 584 operates to sequentially index each of the working spindles 446 through a plurality of workstation locations along the radially spaced and angularly oriented perimeter of the spindle drive head 410.

As illustrated, for example, in FIGS. 3C, 5B and 5C, an end cam shaft 574 extends perpendicularly to the axes of rotation 448 defined by the working spindles 446. Adjacent to the end cam shaft, or more specifically, the cams 576, is positioned at least one end machining apparatus for machining of the end of a piece of bar stock, whereby the end machining apparatus or tool is actuated for machining in response to the associated cam 576 mounted on the end cam shaft 574. As a result of the rotation of cam shaft 574 operation of the end machining apparatus is controlled, thereby machining the ends of stock carried by the work supporting spindles depicted in FIG. 4.

In accordance with an embodiment as represented by the various alternatives depicted in FIGS. 5A through 5C, a side servomotor 510 is mounted to plate 310 and operatively coupled to the side cam shaft 584 to effect rotation of the side cams independently of the operation of the spindle drive or the end cam shaft. It will be appreciated that the servomotor 510 may be connected via a coupling mechanism such as a gearbox 514, and may undergo a speed reduction or torque conversion via the gearbox or similar reducing means. Both the side and end servomotors are also equipped with absolute position encoders, integrated and internal to the servomotor, whose positions are read at power-up of the controller, to which they provide feedback, thus requiring no "homing" function. Gearbox 514 may also include the speed and position sensing means such as a resolver, an encoder or similar device.

Similarly, the end servomotor 512 is operatively connected to the end cam shaft 574 to effect rotation of the end cams 576 independently of the operation of the spindle drive and the side cams. The side and end tooling apparatus are independently controlled in their operation in response to the respective servomotors. As further illustrated in FIGS. 5A-C, the side and end servomotors (510 and 512) are preferably coupled directly to their respective cam shafts. In the alternative they be coupled through worm gears and associated shafts existing in the Model B machines. This alternate embodiment is believed to be less desirable, however, due to the introduction of backlash associated with the worm gear.

Lastly, a threading servomotor assembly 540 may be used to control and drive a threading system for placing threads on or within a part being machined. Independent control of the threading tools, in conjunction with other tooling enable the machine 300 to produce threaded parts more efficiently and reliably than was possible in conventional systems. The threading servomotor assembly 540 includes a servomotor 542 connected by shaft 544 to a drive gear 546, where the drive gear is operatively associated with a threading spindle and gear (not shown) so as to permit the application of threads to a part held in the work-supporting spindles 446 (FIG. 4).

Control of the various servomotors is accomplished using a multi-axis programmable logic controller as described in detail below, and is used for not only controlling overall operation of the screw machine, but for controlling the operation speed of the spindle drive means and the two servomotors. Using such a controller, the operation and control of the two servomotors is as a master-slave to assure that during normal operation of the machine the servomotors are electronically synchronized.

Having described the general configuration of the improved screw machine in accordance with several embodiments, attention is now turned to the detailed description of the additional controls implemented in accordance with an aspect of the system 300. In particular, referring to FIGS. 6 through 10B, there are illustrated various aspects of the control and operation of the system.

Figure 6:
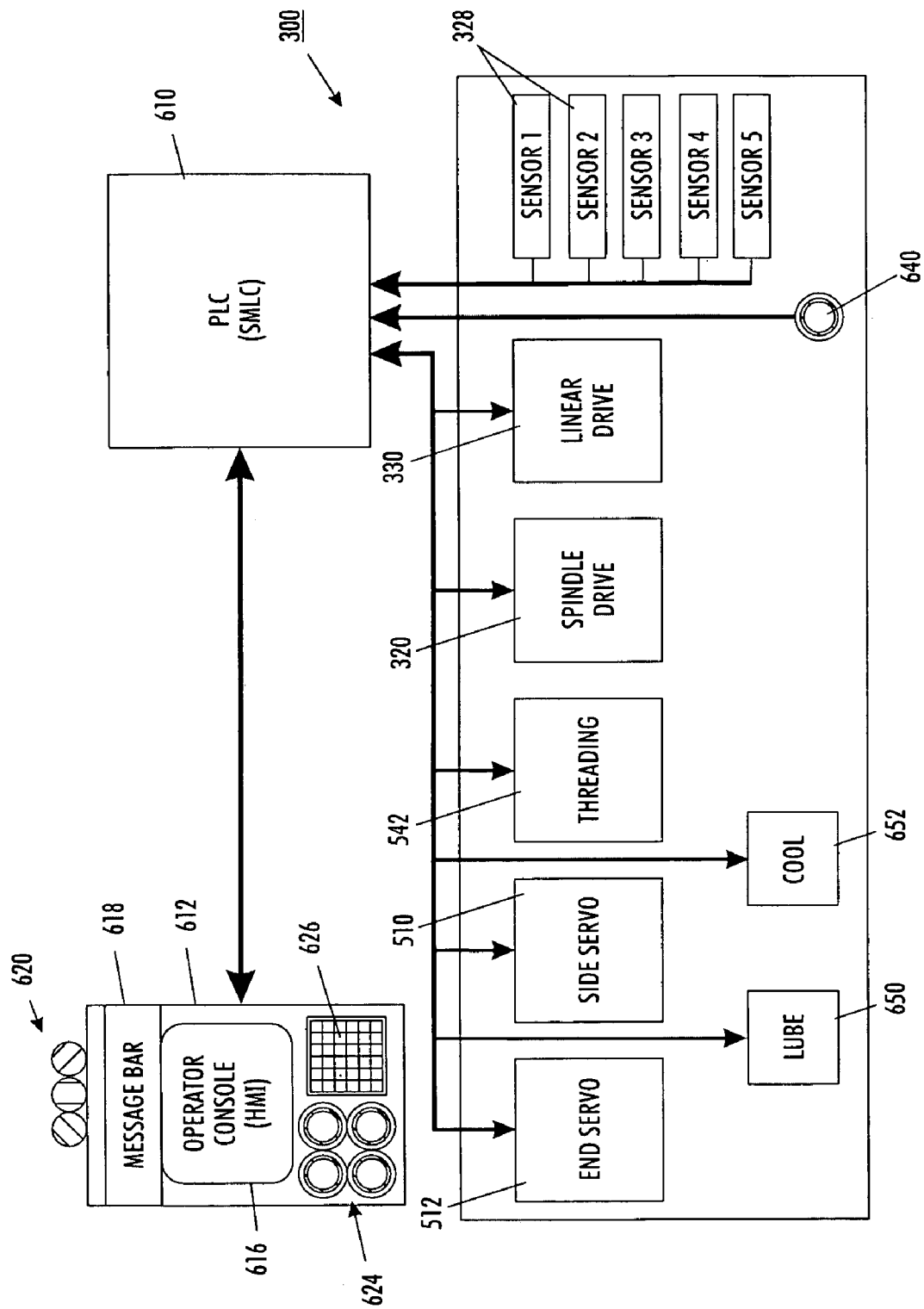
FIG. 6 is a schematic illustration of the components of one embodiment of the screw machine and associated control system.

Referring now to FIG. 6, various aspects of the embodiments described above are controlled by a programmable logic controller (PLC) or similar device suitable for carrying out one or more pre-programmed routines or operations consisting of a plurality of machine instructions that result in the operation of the servomotors, pumps, etc. so as to operate the screw machine in a manner similar to traditional operation. However, the operation of the machine will be more repeatable and reliable, and will be consistent from machine to machine, as the embodiments depicted eliminate many of the wearable and adjustable components from the traditional Model B screw machine. As will be appreciated, there are various ways in which such a system may be implemented, however, as depicted in FIG. 6, the various control and feedback signals of the PLC assure not only the control of the various machine components, but also of any periodic synchronization of the screw machine tooling so as to enable operation and prevent the machine from malfunctioning.

As depicted in FIG. 6, the control system of one embodiment may include two enclosures, a main enclosure 610 and an operator console 612. The main enclosure houses a programmable logic controller such as an Ormec ServoWire Motion & Logic Controller (SMLC). The SMLC operates under the control of a Celeron 850 MHz processor and may include an RS-232 Serial or similar port (for a human-machine interface (HMI)), a plurality of Ethernet ports (for I/O and development), a WAGO 750 Series Ethernet Fieldbus coupler, and a WAGO 750 Series I/O Modules. The SMLC operates in response to a set of pre-programmed instructions, operator selections and inputs from sensors or buttons. The following inputs are specifically identified, however, the list is not intended to exhaustively characterize all sensors or switches employed within the system:

Front Station Emergency Stop Push Button (operator console);

Rear Station Emergency Stop Push Button;
Cycle Start Push Button (op-console);
Cycle Stop Push Button (op-console);
Spindle Jog Selector Switch (op-console);
Jog Forward Push Button (op-console);
Jog Reverse Push Button (op-console);
Coolant Level Ok;
Coolant Overload Tripped;
Low Lube Switch;
Coolant Pressure OK;
Lube Pressure OK; and
Broken Cut Off Switch.

In accordance with the various embodiments, the SMLC is operatively integrated with at least four ServoWire drives (for control of servomotors), circuit protection devices, a control transformer, and other components such as terminal blocks, relays, starters, etc. Attached to the main enclosure is a fan or air conditioner to maintain appropriate operating temperatures within the main enclosure. The operator console 612 contains a HMI touch screen 616 and the necessary push button operators 624 or similar switches for machine control. General machine status is displayed by use of a message bar display 618 on the HMI 612 and a three-light display 620, mounted on top of the operator console. Machine alarms/messages such as Low Lubrication, Overload Tripped, Tool Life Count reached, etc., are displayed on the message bar. When more than one message is pending, each message is placed into a "message-queue" and slowly displayed one message at a time. The message stays in the queue until the alarm condition has been corrected. The three-light beacon 620 (e.g., green, yellow, red) is used to indicate overall status. A green light indicates the machine is running in automatic mode with out any alarms detected. A yellow blinking light indicates that a low level machine alarm exist and requires the operator's attention. A red blinking light indicates that the machine is not running in automatic mode or a fault condition exist.

The SMLC is a fully integrated control device that controls the servo motors (via servodrives), machine I/O and HMI. Programming of the SMLC is by use of CoDeSys IEC 61131-3 standard programming interface with PLCOpen Motion Function Blocks. During operation, the system controls four axes of motion: the main spindle drive (servo 320), the side cam drive (servo 510), the end cam drive (servo 512) and a threading spindle (servo 542), which are depicted, for example, in FIG. 5C. It is also possible to operate a linear drive 330 using the controller for the purpose of operating the fourth position overhead work station.

The main spindle drive 320 uses, in one embodiment, a MAC-J68402 (306 in-lb, 4500 rpm, incremental encoder) servomotor and a SAC-SMM425/SA (460 vac @ 25 amp continuous) servodrive. In the embodiment, the gear reduction for the main spindle drive is 1:1. The Main Spindle, as described above, drives the stock in a rotary motion through a series of spur gears. While running, the Spindle speed is constant and in one direction. The speed of the spindle drive 320 is programmed by the HMI.

The side camshaft 586 is driven under the control of a MAC-HA140C/A (140 in-lb, 5000 rpm, absolute encoder) servomotor 510, which is controlled by a SAC-SMM412/SA (460 vac @ 12 amp continuous) servodrive. To assure adequate torque delivery to the side cam, a gear reduction of 40:1 (motor:load) is used. Similarly, the end camshaft 574 is driven under the control of a MAC-HA090C/A (87 in-lb, 5000 rpm, absolute encoder) servomotor controlled by a SAC-SMM412/SA (460 vac @ 12 amp continuous) servo-drive. Again, a gear reduction of approximately 40:1 (motor:load) is employed to assure adequate torque to drive the end camshaft.

The side servomotor 510 drives the side camshaft 584 with up to five independent cams 586 attached to it, dictating the cutting profile of the side tools during the machining portion of the cycle. During a machine cycle, the side servomotor axis changes between two speeds. The first speed is used during the cutting or machining portion of the cycle, while the second, faster speed is sued during the index portion of the cycle. Both speeds are calculated and controlled by operator entry of work time, index time, machine cutting (working) distance (in cam one-hundredths) and machine index distance (also cam one-hundredths) via operator console 612. The side cam axis also serves as a "Master" axis for the end work axis as is described in more detail below.

The end cam servomotor 512 drives the end camshaft 574, also with up to five independent cams 576 attached to it, dictating the cutting profile of the end tools during the machining portion of the cycle. While running, the end cam axis is "electronically-geared" or synchronized to the side cam axis providing a precise positional relationship between the two axes (or motors). The units of the end cam axis are also in cam one hundredths.

As illustrated in more detail in FIG. 5B, the threading servomotor 542, such as a MAC-J68401 (116 in-lb, 6000 rpm, incremental encoder) is controlled via a SAC-SMM412/SA (460 vac @ 12 amp continuous) servodrive, and is used to directly drive the threading tool(s), which in turn operate on up to two work spindles 446 independently, to achieve either threading and or turning. While threading, the axis is "electronically geared" to the main spindle and shifts between preprogrammed speeds (RPM in and RPM out) based on the side camshaft axis position. While turning, the axis runs at a constant programmed RPM.

In addition to controlling the servomotors, the SMLC also controls the lube and coolant pump motors as illustrated in FIG. 6. The first is a 115 vac lubrication pump motor 650 used to provide lubrication to some of the moving components of the machine. The second is a 2 HP, 460 VAC coolant pump motor 652 used to circulate coolant to the cutting heads and tools in the machine as described in detail with respect to FIG. 3A.

Figure 7:
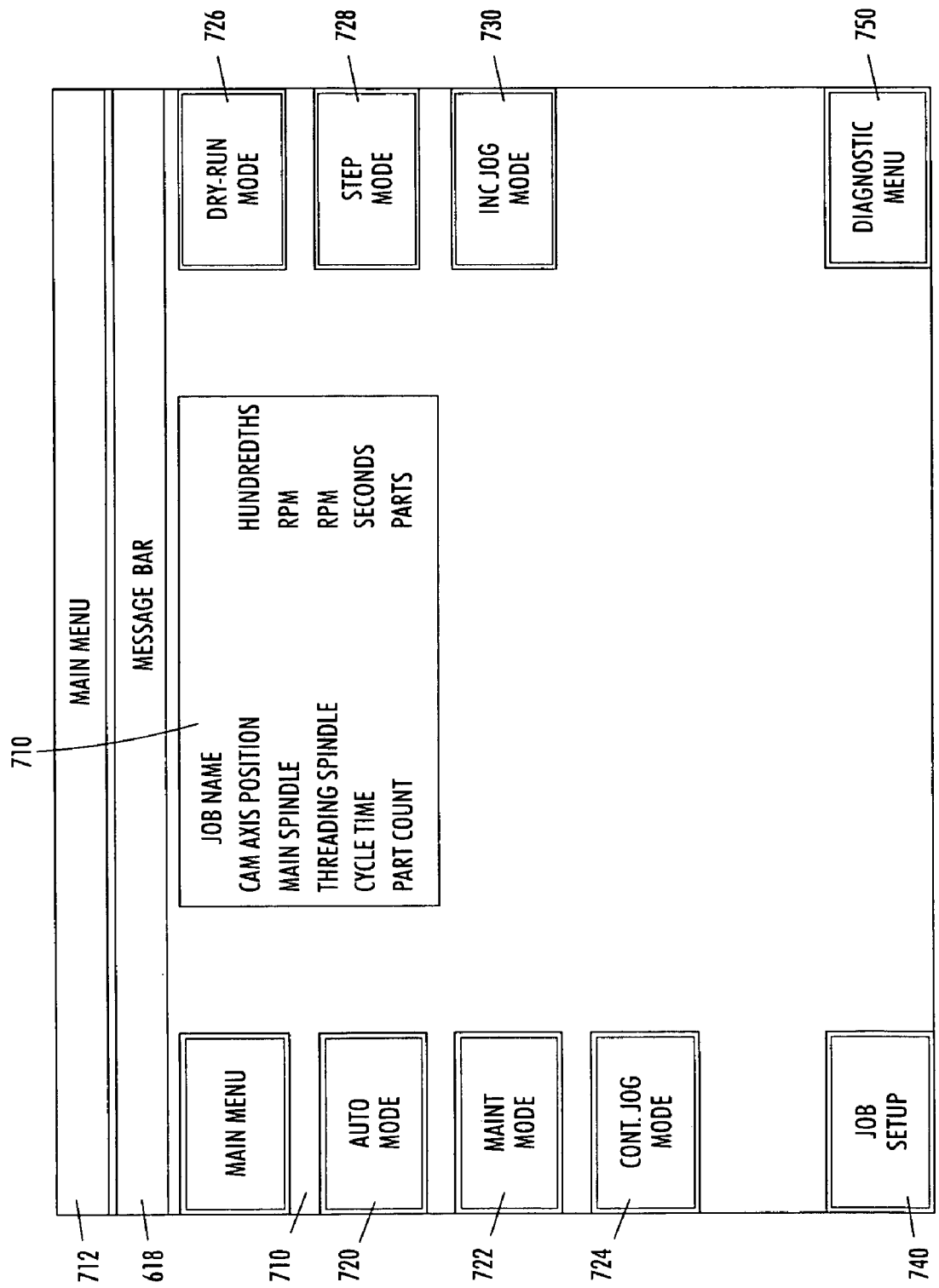
FIGS. 7-10B illustrate various examples of user interface screens to generally characterize functionality provided by the disclosed embodiments.

When power is first applied to the system, both the SMLC and HMI start their power-up cycles. While the SMLC is powering up, the HMI will be temporarily disabled and will display a message to that effect. After the SMLC has powered-up and communications has been established with the HMI, the message is removed and a main menu is displayed on the touch screen 616 of the HMI as depicted in FIG. 7. Before the machine can run, the SMLC assures that all emergency stop pushbuttons 640, located about the machine, must be pulled "out" and an illuminated RESET pushbutton located on the operator console pressed. The RESET pushbutton will illuminate and stay illuminated while the emergency stop circuit is energized. When an emergency stop pushbutton is pressed, the servo drive bus power is removed from all servodrives, control power (24vdc) is removed from all output modules, both Coolant and Lube Pump motors are disabled as well as any other solenoid device, thereby shutting down the system.

Referring to FIG. 7, for example, each HMI mode screen 710 has a title bar 712, indicating the mode in which the system is currently running. Under the control of SMLC 610, the system has several modes of operation, as described in more detail below. To execute the desired mode, the appropriate HMI mode "button" 720-730 is selected on the touch screen. After an operator selects a mode, the HMI screen is displayed with the necessary parameters and "buttons" for that mode of operation.

Figure 8:
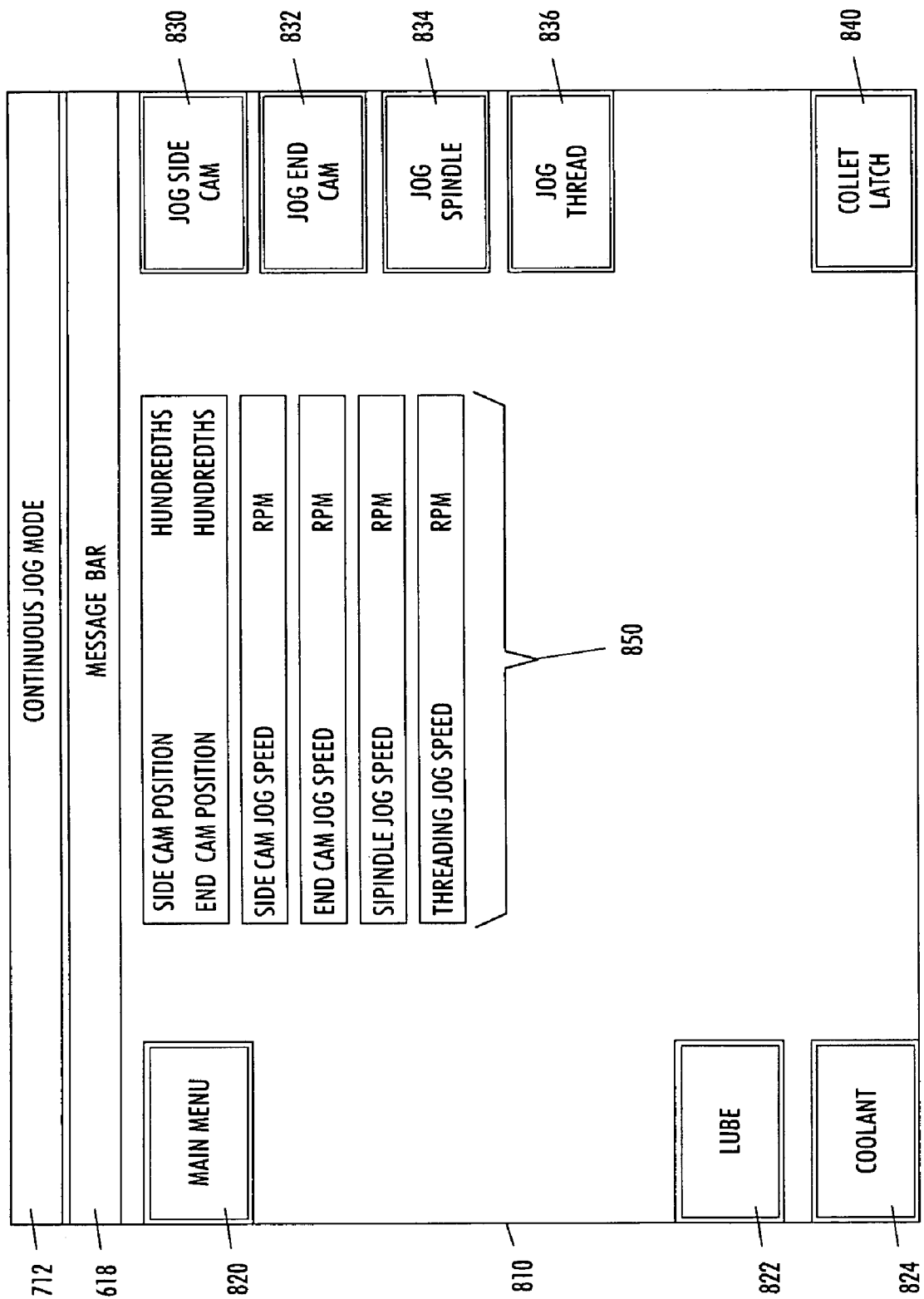

Referring also to FIG. 8, for example, selection of the continuous jog mode is accomplished via "button" 724 on the main menu. One selected, screen 810 is displayed for the continuous jog mode. To select an axis for jogging, the appropriate HMI JOG (AXIS NAME) push "button" 830-836 is selected. The selected motor is enabled and the button is highlighted. Pressing the same button again disables the motor and deselects the button. To jog the selected axis, the JOG FORWARD or JOG REVERSE pushbuttons 624 (located on the operator console 612) are used. While either button is held in, the selected axis or axes are jogged at the desired direction and speed set by the HMI JOG SPEED parameter as reflected in region 850 of the continuous jog screen. Jogging continues until the push button is released. To change jog speed, the desired HMI JOG SPEED parameter is selected on the touch screen 616, and a new speed is entered on the data entry keypad 626. The next time the motor is jogged, the new speed is commanded. For example, jogging of the main spindle drive motor is accomplished by selecting the HMI JOG SPINDLE push button 834 and toggling the HMI SPINDLE STOP/RUN selector switch to the RUN position. Jogging continues until the switch is returned to the STOP position or JOG SPINDLE is deselected. While in Continuous Jog Mode, the START and STOP push buttons (not shown) on the operator console are disabled. The lubrication and coolant flow may also be enabled in response to buttons 822 and 824, respectively.

Although not specifically illustrated as menu pages, the following additional menus may be selected via the main menu, each menu having a button such as 820 to return the operator to the main menu. The Incremental Jog Mode allows jogging of the side and end camshaft servomotors to a preset value (in cam hundredths) entered in the HMI. Each time the associated JOG FORWARD push button is pressed, the camshafts will increment or advance by the programmed increment or distance.

Automatic mode is the production mode of the machine. In this mode, the servomotors cyclically perform their predetermined profile set via the HMI, in turn cycling the machining tools through their cam profile. Automatic mode is also accessed from the Main Menu 710 by selecting the AUTO MODE "button." When started in automatic mode, the coolant pump is first turned on and all spindles come up to speed.

To start the machine in the automatic mode, the following conditions must first be meet:
  a valid job has been programmed and entered by the operator;
  lube pump has been started;
  any faults have been reset; and
  START push button pressed (on the operator console).

The system will produce a part every time the machine indexes (or completes one cam cycle) during operation in the automatic mode, and the machine continues to run until one of the following events occurs:
  STOP push button pressed (on operator console);
  parts to Cut counter has reached its preset value (job completed);
  tool Life counter(s) has reached its preset (maintenance required); or
  a fault is detected.

Before running in automatic mode, both the side and end camshaft servomotor axes must first be correctly positioned, and to do so, each axis performs the following alignment procedure:
  If the CAM position is greater than the CYCLE START POSITION, but less than the "INDEX POSITION", the collet latch (found on the conventional Model B) will raise and the cam axis moves in the negative direction until it reaches the "CYCLE START POSITION".
  If the Cam position is less than the "CYCLE START POSITION but greater than the INDEX POSITION, then the Cam axis will move in the positive direction until it reaches the CYCLE START POSITION.
  While positioning, both axes move at the CAM REFERENCE SPEED. Once both axes are at their CYCLE START POSITIONS, the End Cam axis is synchronized to the Front axis allowing the End Cam to closely follow the Front Cam.

The Collet Latch is lowered after the alignment procedure.

During a machine cycle, the Cam axes shift between the "working" and "indexing" part of the cycle. The HMI WORK-INDEX and INDEX-WORK parameters, whose units are also in "cam one hundredths", sets these shift points. The speeds at which the side and end cam servomotors run are calculated by the HMI CYCLE TIME, WORK TIME and INDEX TIME parameters, whose units are in seconds.

To stop the machine, the STOP push button is pressed. The collet latch 331 is then raised, preventing the feeding of any new parts. The machine continues to run until the five parts already fed out of the work spindles have been machined. After the last part has been machined, the front and end cams will index and stop at the CYCLE START POSITION and the coolant pump is automatically turned off. The Lube pump continues to run until ether stopped by the operator or the stopped time has exceeded the HMI LUBE OFF TIME parameter (set in minutes).

While running, both HMI PART and HMI TOOL LIFE counters are incremented each cycle. The machine will stop automatically (as described previously) when the PART counter is equal to the HMI NUMBER OF PARTS parameter. The PART COUNTER can be reset any time by pressing the HMI RESET PART pushbutton. When a TOOL LIFE counter approaches the TOOL LIFE WARNING preset value, the Yellow Beacon light is turned on and a message is displayed on the HMI. When this counter is equal to the Maximum TOOL LIFE LIMIT the machine will stop automatically.

The machine can be "paused" by pressing the HMI CYCLE PAUSE push button. The machine finishes its current machine/index cycle and stops will all its motors enabled. The machine is restarted by pressing the START push button, and the HMI CYCLE PAUSE push button is deselected. An HMI HOURS OF OPERATION timer is enabled while running in Automatic Mode with the collet latch lowered.

The Dry Run mode is accessed from the main menu by pressing the HMI DRY RUN MODE button 726. Dry Run mode is the same as Automatic mode described above, except that the collet latch is raised and no parts/stock are fed. While in this mode, the coolant is not automatically turned on, and the PART COUNTER, TOOL COUNTERS and HOURS OF OPERATION timer do NOT operate. The Dry Run mode cycle continues to run until either the STOP push button is pressed or a fault occurs.

The Step mode is accessed from the main menu by selecting the HMI STEP MODE button 728. The Step Mode screen (not shown) is displayed, allowing the operator to step thought a single machine cycle, and allow inspection of the part at each step of the process. Each time the START push button is pressed during the Step mode, the cycle will step through the next operation. Each step consists of the following. The spindles come up to speed, the coolant is turned on, both camshaft axes move to their zero positions. The machine in cycled for one complete automatic mode cycle. After the cycle is complete the coolant is turned off and spindles are stopped. The operator can enable or disable the feeding of parts by pressing a COLLET push button on the HMI touch screen. As in the Dry Run mode, the PART COUNTER, TOOL COUNTERS and HOURS of OPERATION timer are not enabled while in Step mode.

The Diagnostic mode is accessed from the main menu by pressing the HMI DIAGNOSTIC button 750. Items such as machine parameters, I/O diagnostics, and drive parameters can be viewed/changed when operating in the Diagnostics mode. Homing or resetting both camshaft servomotors' absolute encoders is also performed while in this mode, when all motors are disabled and the START, JOG FORWARD and JOG REVERSE push buttons are disabled.

The Maintenance mode is also accessed from the main menu by pressing the MAINTENANCE mode button 722. The Maintenance mode is used when any maintenance or adjustments are required by the machine. While in this mode, all motors are disabled and the START, JOG FORWARD and JOG REVERSE push buttons are disabled.

Figure 9:
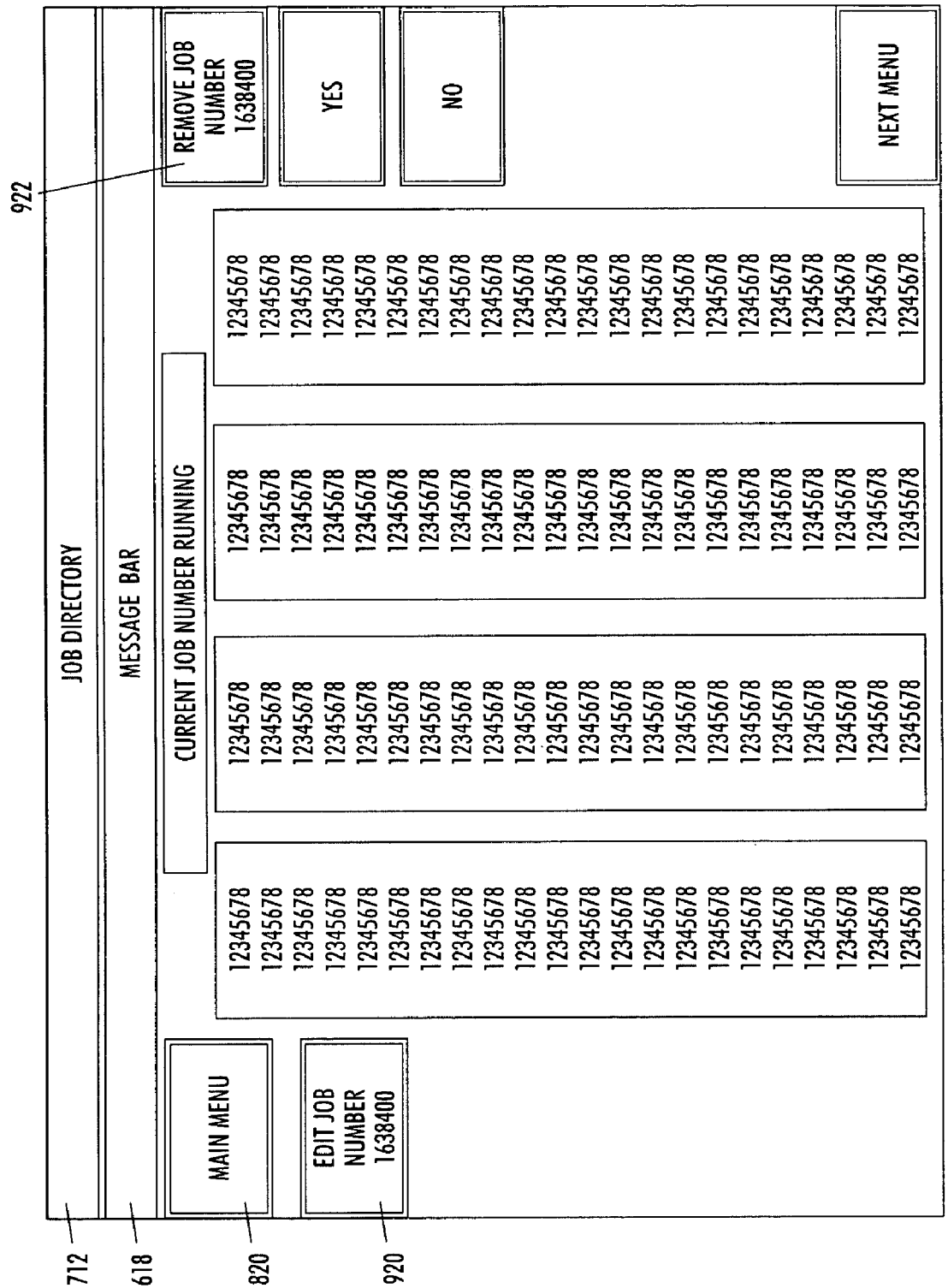
Figure 10A:
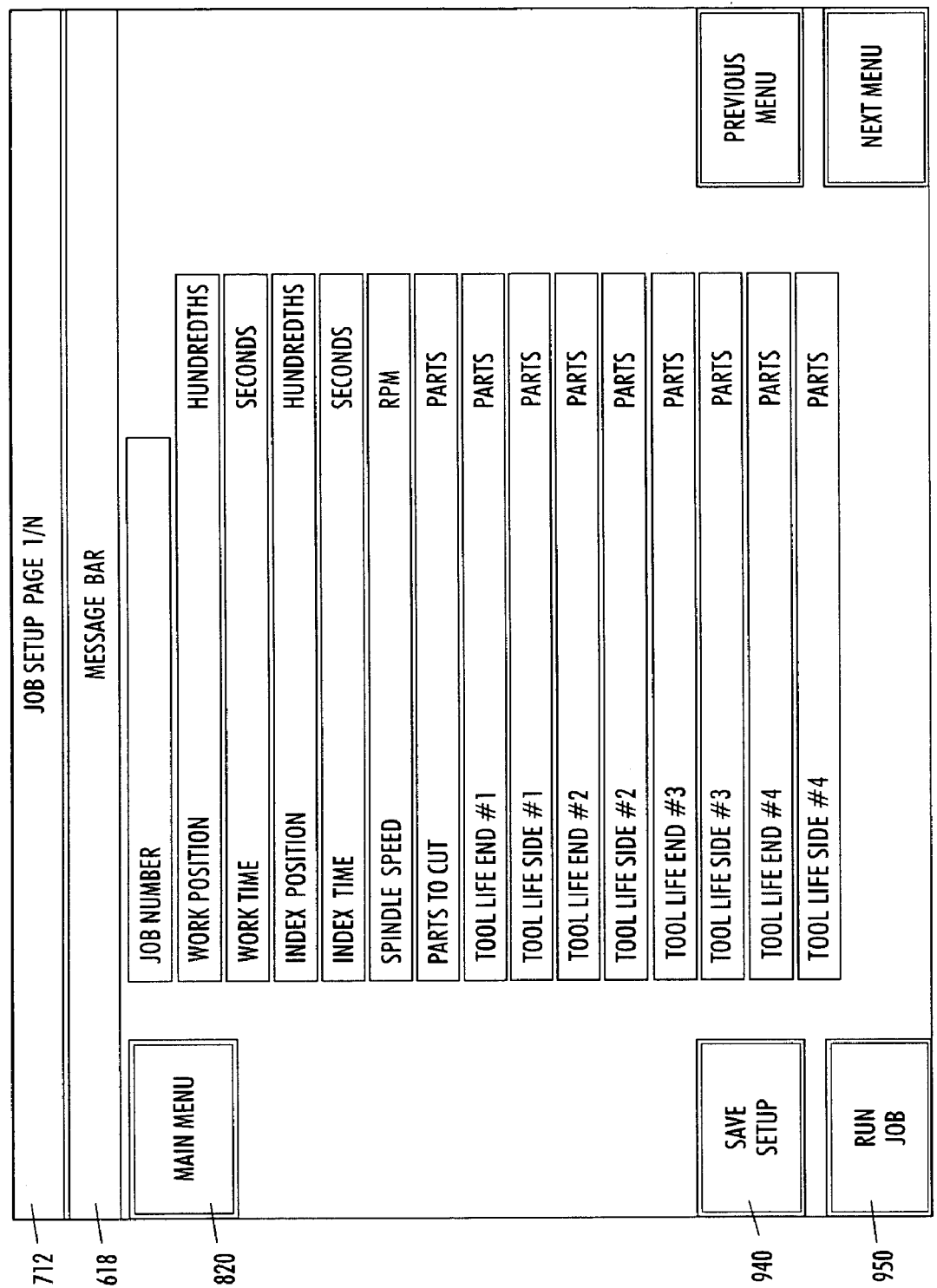
Figure 10B:
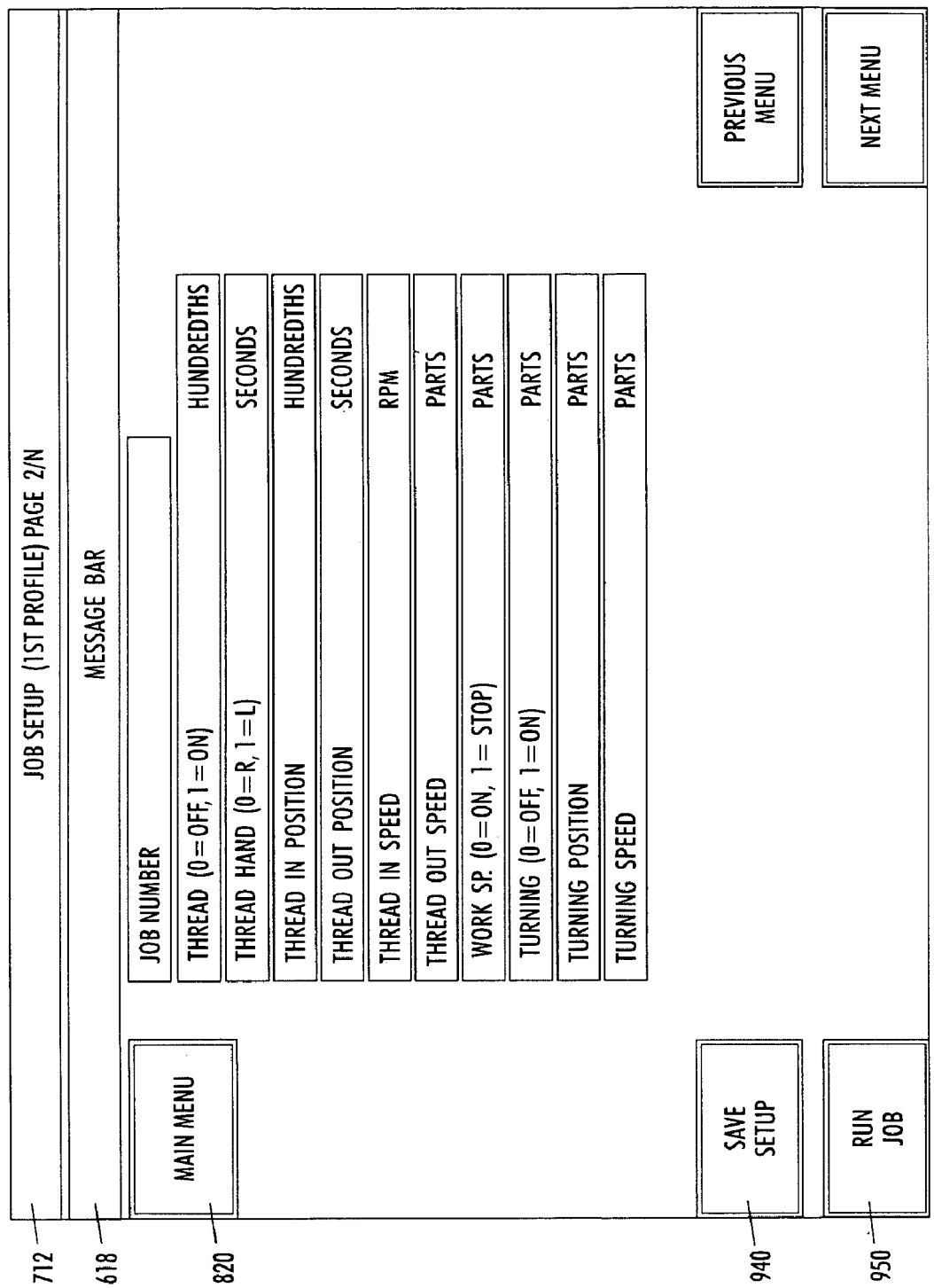

Referring to FIGS. 9 and 10A-10B, the Job Setup menus are displayed in response to an operator's selection of button 740 on the main menu. The Job Setup menus allow the changing of the machine parameters and storing/retrieving of Job Numbers or "job recipes". The system allows for the storage/selection of up to approximately eighty job numbers/recipes, although it will be appreciated that more may be stored with the addition of memory or a storage device. Currently entered job numbers are listed on the Job Directory as displayed in FIG. 9. It will be appreciated that alternative numbering or naming conventions may be employed for job identification.

To edit or add a new job, the EDIT JOB NUMBER button 920 is pressed. A data numeric keypad is displayed (over the job directory screen—not shown) and the desired job number is entered. The Job Setup—Page 1 Screen is then displayed (FIGS. 10A-10B). To change a machine parameter, the parameter value number is touched, the keypad is displayed and a new value is entered. To save changes, the SAVE SETUP button 940 is selected. To load or run the current setup the RUN JOB button 950 is selected.

To remove a job number from the machine, the REMOVE JOB NUMBER button 922 is pressed and the desired job number is entered. After entering the number, a confirmation screen is displayed asking the operator to confirm (yes or no). If YES then the job is deleted for the system and the job directory is updated.

In recapitulation, the disclosed embodiments include a method and apparatus for an improved automatic screw machine employing at least two servomotors to drive side and end tools thereof, wherein the operation of the screw machine is controlled in response to real-time signals and a preprogrammed controller receiving said signals. In addition, the preprogrammed controller may also control one or more of the threading servomotor, spindle drive and a $4^{th}$ position overhead work station linear servo drive to assure continued and synchronous operation of the entire machine.

It is, therefore, apparent that there has been provided, in accordance with disclosed embodiments, a method and apparatus for an improved screw machine. While the embodiments have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A multiple spindle screw machine, comprising:
   a frame;
   a spindle supporting head operatively associated with the frame for indexible rotation;
   a plurality of work-supporting spindles mounted in said spindle supporting head for rotation therewithin and relative thereto about parallel axes radially spaced from and angularly spaced about a spindle drive shaft;
   a spindle drive, operatively connected to the spindle drive shaft, to effect rotation of the work supporting spindles, and lengths of stock carried thereby, about axes of rotation defined by the work supporting spindles;
   a side servomotor operatively connected to a side cam shaft to effect rotation of a plurality of side cams independently of the operation of the spindle drive, said side cam shaft extending parallel to the axes of rotation defined by the working spindles;
   side cams mounted on said side cam shaft, for rotation thereby and to cause operation of side machining tools thereby machining the lengths of stock;
   an end servomotor operatively connected to an end cam shaft and extending perpendicularly to the axes of rotation defined by the working spindles;
   at least one end cam mounted on the end cam shaft for rotation thereof independently of the operation of the spindle drive, and to cause operation of an end machining apparatus, thereby machining the lengths of stock carried by the work supporting spindles; and
   a multi-axis controller for controlling the operation of the spindle drive, the side servomotor and the end servomotor.

2. The machine as set forth in claim 1 wherein the side servomotor and the end servomotor are independently operable.

3. The machine as set forth in claim 1, wherein at least one of said side and end servomotors employs an N-to-1 speed reducer in establishing an operative connection to the respective cam shaft.

4. The machine of claim 3, wherein the N-to-1 speed reduction is at least 40-to-1.

5. The machine of claim 3, wherein the N-to-1 speed reducer is a gear box.

6. The machine of claim 1, further comprising a threading axis servomotor operatively connected to a threading tool to control operation of the threading tool relative to stock carried in at least one work supporting spindle.

7. The machine of claim 1, wherein said multi-axis controller receives, as input, a signal from at least one servomotor, and generates as output, in response to a set of preprogrammed instructions and said input, at least three output signals to control the spindle drive speed as well as the speed and position of the end and side servomotors.

8. The machine of claim 2, wherein the side servomotor is controlled to cause rotation thereof, while at the same time the end servomotor is maintained in a fixed position.

9. The machine of claim 7, wherein said multi-axis controller is a servowire motion and logic controller having at least one mode in which at least the side and end servomotors cyclically operate in accordance with a predetermined profile stored in controller, and in turn cycling the machining tools through their cam profile so as to complete the production of a part by a series of sequential cycles.

10. The machine of claim 1, further including a pump assembly having a fluid bypass path associated therewith.

11. The multiple spindle screw machine of claim 1, further including at least one adjustment mechanism for aligning a servomotor with an associated cam or drive shaft.

12. The machine as set forth in claim 1, wherein said side cams are mounted on said side cam shaft, for rotation thereby and to cause operation of side machining tools thereby machining the lengths of stock, and where said side machining tools are positioned adjacent one another and substantially parallel to the side cam shaft.

13. The machine as set forth in claim 1, further comprising an indexing mechanism driven by the side cam shaft for sequentially indexing each of the working spindles through a plurality of workstations.

14. The machine as set forth in claim 1, further comprising a linear drive operatively connected to a fourth position overhead work station, wherein said linear drive is controlled by the controller to effect the operation of the fourth position overhead work station.

15. A multiple spindle screw machine, comprising:
a frame;
a spindle drive shaft mounted on the frame for rotation about a stationary axis;
a spindle supporting head mounted on the frame for indexible rotation coaxially about said spindle drive shaft;
a plurality of work-supporting spindles mounted in said spindle supporting head for rotation therewithin and relative thereto by said spindle drive shaft about parallel axes spaced radially and angularly about said spindle drive shaft;
a servomotor spindle drive operatively connected to the spindle drive shaft to effect rotation of the work supporting spindles and lengths of stock carried thereby;
a side cam shaft extending parallel to the axes of rotation defined by the working spindles;
a plurality of side machining tools positioned adjacent one another and along a line substantially parallel to the side cam shaft;
a plurality of side cams, mounted on the side cam shaft, for rotation thereby to cause operation of said side machining tools thereby machining the lengths of stock;
an indexing mechanism driven by the side cam shaft for sequentially indexing each of the working spindles through a plurality of workstations;
an end cam shaft extending perpendicularly to the axes of rotation defined by the working spindles;
at least one end machining apparatus positioned adjacent the end cam shaft;
at least one end cam mounted on the end cam shaft for rotation thereby to cause operation of the end machining apparatus thereby machining the lengths of stock carried by the work supporting spindles;
a side servomotor;
means operatively connecting the side servomotor to the side cam shaft to effect rotation of the side cams independently of the operation of the spindle drive;
an end servomotor;
means operatively connecting the end servomotor to the end cam shaft to effect rotation of the end cams independently of the operation of the spindle drive; and
a multi-axis controller for controlling the operation of the speed spindle drive means and the two servomotors.

16. A method of operating a multiple spindle screw machine using a multi-axis controller, comprising:
operating a spindle drive, operatively connected to a spindle drive shaft, to effect rotation of a plurality of work supporting spindles, and lengths of stock carried thereby, about axes of rotation defined by the work supporting spindles,
in response to the controller, operating a side servomotor, operatively connected to a side cam shaft, to effect rotation of a plurality of side cams independently of the operation of the spindle drive, said side cams causing the operation of side machining tools to thereby machine the lengths of stock;
operatively connected to an end cam shaft and extending perpendicularly to the axes of rotation defined by the working spindles, to cause the operation of an end machining apparatus independently of the operation of the spindle drive, and, thereby machining the lengths of stock carried by the work supporting spindles; and
controlling the operation of the spindle drive, the side servomotor and the end servomotor.

17. The method of claim 16, wherein the operation of the spindle drive, the side servomotor and the end servomotor are each in response to signals from the controller.

18. The method of claim 17, further comprising operation of a threading servomotor and a linear collet drive.

19. The method of claim 17, wherein the operation of the linear servomotor controlling the fourth position overhead workstation is also in response to signals from the controller.

* * * * *